US012436483B2

(12) United States Patent
Ochiai

(10) Patent No.: US 12,436,483 B2
(45) Date of Patent: Oct. 7, 2025

(54) ENDLESS BELT, BELT UNIT, AND IMAGE FORMING APPARATUS

(71) Applicant: FUJIFILM Business Innovation Corp., Tokyo (JP)

(72) Inventor: Makoto Ochiai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 632 days.

(21) Appl. No.: 17/832,668

(22) Filed: Jun. 5, 2022

(65) Prior Publication Data

US 2023/0168610 A1 Jun. 1, 2023

(30) Foreign Application Priority Data

Nov. 26, 2021 (JP) ................................ 2021-192551

(51) Int. Cl.
*G03G 15/16* (2006.01)
*C08L 19/00* (2006.01)

(52) U.S. Cl.
CPC ............ *G03G 15/162* (2013.01); *C08L 19/00* (2013.01)

(58) Field of Classification Search
CPC .............................. G03G 15/162; C08L 19/00
See application file for complete search history.

(56) References Cited

U.S. PATENT DOCUMENTS

2023/0152734 A1* 5/2023 Sugiura ................ G03G 15/161 399/101

FOREIGN PATENT DOCUMENTS

| | | |
|---|---|---|
| JP | 2007177802 | 7/2007 |
| JP | 2010197579 | 9/2010 |
| JP | 4735244 | 7/2011 |
| JP | 2018122968 | 8/2018 |

OTHER PUBLICATIONS

"Notice of Reasons for Refusal of Japan Counterpart Application", issued on Aug. 5, 2025, with English translation thereof, pp. 1-5.

* cited by examiner

*Primary Examiner* — Mark F. Huff
*Assistant Examiner* — Boone Alexander Evans
(74) *Attorney, Agent, or Firm* — JCIPRNET

(57) ABSTRACT

An endless belt includes a base material layer containing a polymer material and conductive particles, in which in dynamic viscoelasticity measurement at a temperature of 35° C., a value of loss tangent at a measurement frequency in a range from 0.1 Hz to 10 Hz is smaller than a value of loss tangent at a measurement frequency in a range from 10 Hz to 100 Hz, and tensile stress when the base material layer is stretched by 5% at a temperature of 24° C. is 7 MPa or more, and when the base material layer is stretched by 5% at a temperature of 24° C. and held for a period of 10 minutes, a maximum value TSmax and a minimum value TSmin of the tensile stress during the period satisfy a relationship of {(TSmax−TSmin)/TSmax×100}≤15.

20 Claims, 3 Drawing Sheets

ENDLESS BELT, BELT UNIT, AND IMAGE FORMING APPARATUS

CROSS-REFERENCE TO RELATED APPLICATIONS

This application is based on and claims priority under 35 USC 119 from Japanese Patent Application No. 2021-192551 filed Nov. 26, 2021.

BACKGROUND

(i) Technical Field

The present disclosure relates to an endless belt, a belt unit, and an image forming apparatus.

(ii) Related Art

JP2018-122968A discloses a belt conveyance device which includes an annular belt exhibiting viscoelasticity and having a peak frequency in the frequency characteristic of loss tangent, a driving unit that rotates the annular belt, and a stress applying unit that applies tensile stress to the annular belt, and in which a stress application frequency, which is a frequency of the tensile stress that is periodically applied to the annular belt with the rotation of the annular belt, is equal to or lower than the peak frequency of the annular belt.

JP2010-197579A discloses an endless belt which has a base material and a surface layer, and in which in a case where a peak temperature of loss tangent of the surface layer is set to be T(° C.), the loss tangent of the surface layer at T° C. or higher and T+70° C. or lower is 0.7 or more and 1.0 or less.

JP2007-177802A discloses a semi-conductive rubber belt in which a stretching force damping factor, which is obtained by a logarithmic approximation expression that is obtained from a test result obtained by stretching by 5% for 30 days by a biaxial stretching roll at 25° C.±2° C. and 55%±5% RH, is less than 50%.

SUMMARY

Aspects of non-limiting embodiments of the present disclosure relate to an endless belt that stably rotates for a long period of time, compared to an endless belt that does not satisfy a relationship that in dynamic viscoelasticity measurement at a temperature of 35° C. of a base material layer, a value of loss tangent at a measurement frequency in a range from 0.1 Hz to 10 Hz is smaller than a value of loss tangent at a measurement frequency in a range from 10 Hz to 100 Hz, an endless belt in which tensile stress when a base material layer is stretched by 5% at a temperature of 24° C. is less than 7 MPa, or an endless belt in which the maximum value TSmax and the minimum value TSmin of tensile stress when a base material layer is stretched by 5% at a temperature of 24° C. and held for a period of 10 minutes have a relationship of $\{(TSmax-TSmin)/TSmax\times100\}>15$.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above problems include the following aspect.

According to an aspect of the present disclosure, there is provided an endless belt including a base material layer containing a polymer material and conductive particles, in which in dynamic viscoelasticity measurement at a temperature of 35° C., a value of loss tangent at a measurement frequency in a range from 0.1 Hz to 10 Hz of is smaller than a value of loss tangent at a measurement frequency in a range from 10 Hz to 100 Hz, and tensile stress when the base material layer is stretched by 5% at a temperature of 24° C. is 7 MPa or more, and when the base material layer is stretched by 5% at a temperature of 24° C. and held for a period of 10 minutes, a maximum value TSmax and a minimum value TSmin of the tensile stress during the period satisfy a relationship of $\{(TSmax-TSmin)/TSmax\times100\}\leq15$.

BRIEF DESCRIPTION OF THE DRAWINGS

Exemplary embodiment(s) of the present invention will be described in detail based on the following figures, wherein.

DETAILED DESCRIPTION

Figure 1:
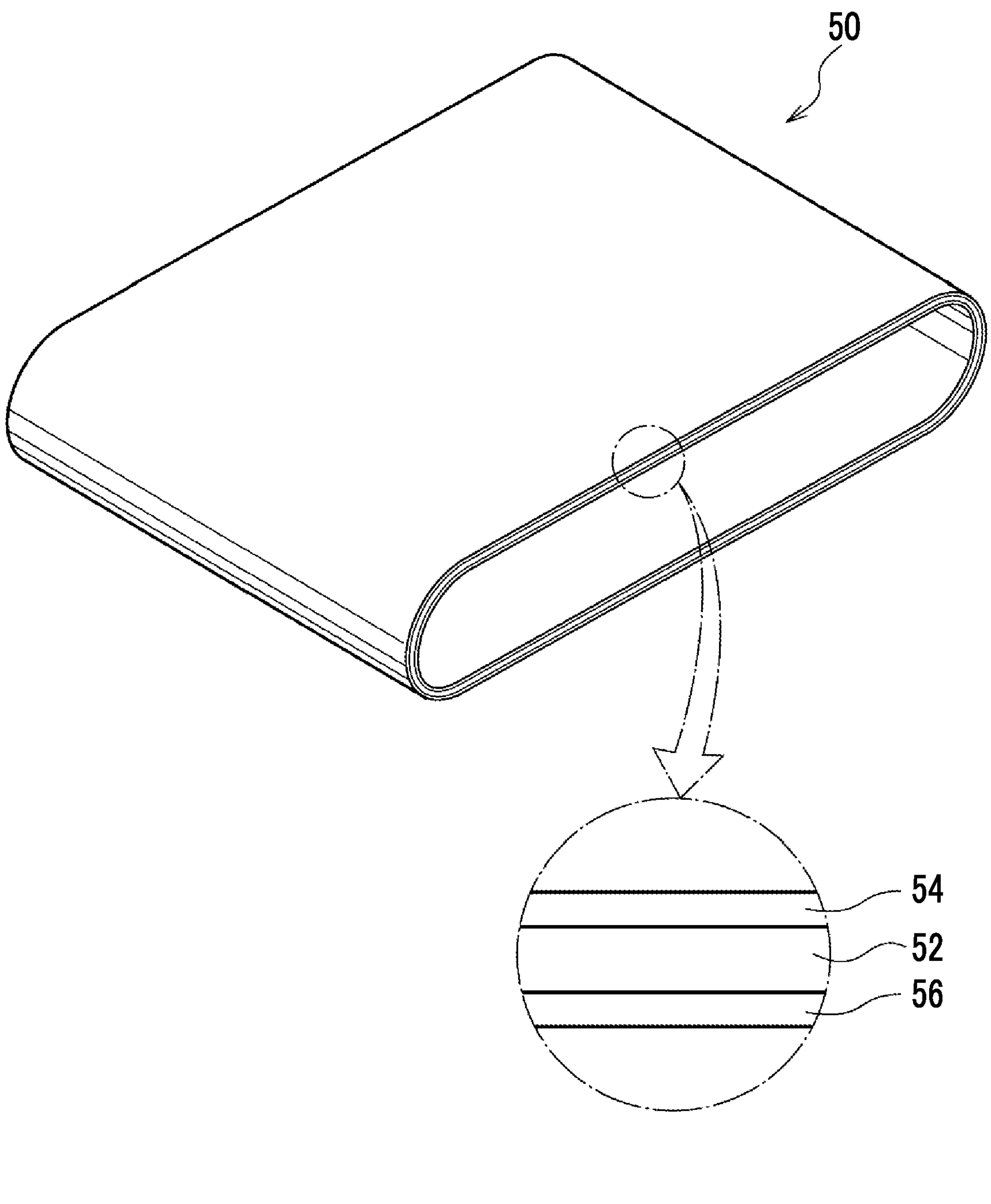
FIG. 1 is a schematic perspective view showing an example of an endless belt according to the present exemplary embodiment.

Hereinafter, an exemplary embodiment of the present disclosure will be described. The description and examples are for exemplifying the exemplary embodiment and do not limit the scope of the exemplary embodiment.

In numerical ranges described stepwise in the present disclosure, an upper limit value or a lower limit value described in one numerical range may be replaced with an upper limit value or a lower limit value in a numerical range in another stepwise description. Further, in the numerical ranges described in the present disclosure, the upper limit values or the lower limit values in the numerical ranges may be replaced with the values shown in examples.

In the present disclosure, the term "process" includes not only an independent process but also a process unable to be clearly distinguished from other processes as long as the purpose of the process is achieved.

In the present disclosure, in a case where an exemplary embodiment is described with reference to the drawings, the configuration of the exemplary embodiment is not limited to the configuration shown in the drawings. Further, the size of members in each drawing is conceptual, and the relative relationship between the sizes of the members is not limited thereto.

In the present disclosure, each component may include a plurality of types of relevant substances. When the amount of each component in a composition is mentioned in the present disclosure, in a case where a plurality of types of substances corresponding to each component are present in the composition, unless otherwise specified, the amount of each component means the total amount of the plurality of types of substances present in the composition.

Endless Belt

An endless belt according to the present exemplary embodiment includes a base material layer containing a polymer material and conductive particles. The endless belt according to the present exemplary embodiment may include a protective layer on at least one of the outer peripheral surface or the inner peripheral surface of the base material layer.

FIG. 1 is a schematic perspective view showing an example of the endless belt according to the present exemplary embodiment. An endless belt 50 shown in FIG. 1 includes a base material layer 52, a protective layer 54, and a protective layer 56. The protective layer 54 is provided on the outer peripheral surface of the base material layer 52 and is a layer configuring the outer peripheral surface of the endless belt 50. The protective layer 56 is provided on the inner peripheral surface of the base material layer 52 and is a layer configuring the inner peripheral surface of the endless belt 50.

The endless belt according to the present exemplary embodiment is used, for example, by being incorporated into an electrophotographic image forming apparatus as a part of a transfer unit. The endless belt according to the present exemplary embodiment is used as, for example, a secondary transfer belt or an intermediate transfer belt.

In the base material layer of the endless belt according to the present exemplary embodiment, in the dynamic viscoelasticity measurement at a temperature of 35° C., the value of loss tangent at a measurement frequency in a range from 0.1 Hz to 10 Hz is smaller than the value of loss tangent at a measurement frequency in a range from 10 Hz to 100 Hz, tensile stress when the base material layer is stretched by 5% at a temperature of 24° C. is 7 MPa or more, and when the base material layer is stretched by 5% at a temperature of 24° C.±3° C. and held for a period of 10 minutes, a maximum value TSmax and a minimum value TSmin of the tensile stress during the period satisfy a relationship of $\{(TSmax-TSmin)/TSmax\times100\}\leq15$.

Figure 2:
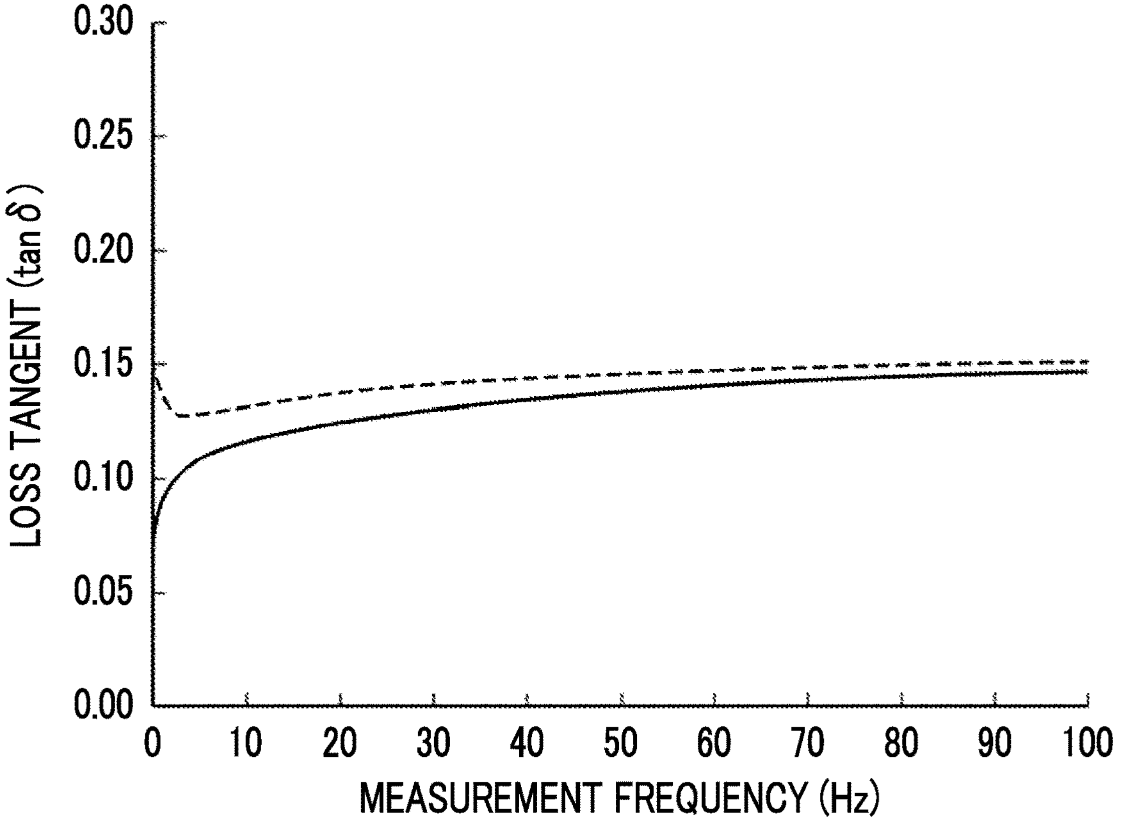
FIG. 2 is an example of the result of dynamic viscoelasticity measurement relating to a base material layer, and is a graph showing a relationship between a measurement frequency and loss tangent.

FIG. 2 is an example of the result of dynamic viscoelasticity measurement at a temperature of 35° C. of the base material layer, and is a graph showing the relationship between a measurement frequency and loss tangent.

The solid line graph is an example of the base material layer of the endless belt according to the present exemplary embodiment. In the present example, the value of the loss tangent at the measurement frequency in a range from 0.1 Hz to 10 Hz is smaller than the value of the loss tangent at the measurement frequency in a range from 10 Hz to 100 Hz.

The broken line graph is an example of a base material layer of an endless belt of the related art. In this example, the value of the loss tangent at the measurement frequency of 0.1 Hz and the value of the loss tangent at the measurement frequency of 1 Hz are larger than the value of the loss tangent at the measurement frequency of 10 Hz. Therefore, this example does not satisfy the requirement that the value of the loss tangent at the measurement frequency in a range from 0.1 Hz to 10 Hz is smaller than the value of the loss tangent at the measurement frequency in a range from 10 Hz to 100 Hz.

In the endless belt according to the present exemplary embodiment, the mechanical characteristic of the base material layer is specified by loss tangent and tensile stress, and the endless belt stably rotates for a long period of time by controlling the values of the loss tangent and the tensile stress. The mechanism is presumed as follows.

In a case where a requirement that in the dynamic viscoelasticity measurement at a temperature of 35° C. of the base material layer, the value of the loss tangent at the measurement frequency in a range from 0.1 Hz to 10 Hz is smaller than the value of the loss tangent at the measurement frequency in a range from 10 Hz to 100 Hz is not satisfied (for example, in a case where the value of the loss tangent at the measurement frequency of 0.1 Hz is larger than the value of the loss tangent at the measurement frequency of 10 Hz and the value of the loss tangent at the measurement frequency of 1 Hz is larger than the value of the loss tangent at the measurement frequency of 10 Hz), while the endless belt rotates, the endless belt continuously receives an external load due to stretch deformation to cause a stress change (stress relaxation), and residual strain and/or permanent strain easily increases. Then, the stickiness of the endless belt in a dynamic state is lowered, so that the adhesion to a transported medium (that is, a recording medium) and/or the followability to the surface of the transported medium is lowered. Further, in a case where the above requirement is not satisfied, the rotation speed of the endless belt tends to easily fluctuate due to the vibration from a driving device that rotates the endless belt, and the endless belt tends to easily vibrate. From this viewpoint, the base material layer of the endless belt of the present exemplary embodiment shall satisfy the requirement that in the dynamic viscoelasticity measurement at a temperature of 35° C., the value of the loss tangent at the measurement frequency in a range from 0.1 Hz to 10 Hz is smaller than the value of the loss tangent at the measurement frequency in a range from 10 Hz to 100 Hz.

In the dynamic viscoelasticity measurement at a temperature of 35° C. of the base material layer, the value $\tan\delta(0.1)$ of the loss tangent at the measurement frequency of 0.1 Hz, the value $\tan\delta(1)$ of the loss tangent at the measurement frequency of 1 Hz, the value $\tan\delta(10)$ of the loss tangent at the measurement frequency of 10 Hz, and the value $\tan\delta(100)$ of the loss tangent at the measurement frequency of 100 Hz satisfy preferably, for example, a relationship of $\tan\delta(0.1)<\tan\delta(1)<\tan\delta(10)<\tan\delta(100)$.

In a case where the tensile stress when the base material layer is stretched by 5% at a temperature of 24° C. is less than 7 MPa, target tension is not obtained when the endless belt is stretched, and the endless belt cannot hold the transported medium (that is, the recording medium) well, or the rotation accuracy of the endless belt cannot be sufficiently obtained. From this viewpoint, in the base material layer of the endless belt of the present exemplary embodiment, the tensile stress when the base material layer is stretched by 5% at a temperature of 24° C. is 7 MPa or more. The value is preferably, for example, 10 MPa or less from the viewpoint of causing the endless belt to continue to stably rotate without being extended even though the endless belt is stretched for a long period of time.

In a case where when the base material layer is stretched by 5% at a temperature of 24° C. and held for a period of 10 minutes, in the maximum value TSmax and the minimum value TSmin of the tensile stress during that period, $\{(TSmax-TSmin)/TSmax\times100\}$ exceeds 15, the endless belt cannot hold the transported medium (that is, the recording medium) well, and there is a case where the transport accuracy of the transported medium cannot be sufficiently obtained. Further, in a case where $\{(TSmax-TSmin)/Smax\times100\}$ exceeds 15, excessive tensile stress occurs in the endless belt due to a tension change according to the rotational movement in a lap portion to a roll member on which the endless belt is stretched, and a shear force due to compression and shear deformation at a nip portion with a member facing the outer peripheral surface of the endless belt when the rotational movement is stopped and started (that is, when mechanical stress is generated), and as a result, the adhesion of the endless belt to the transported medium decreases, the mechanical characteristic of the endless belt decreases, and the destruction of the surface layer of the endless belt increases. From this viewpoint, in the base material layer of the endless belt of the present exemplary embodiment, $\{(TSmax-TSmin)/TSmax\times100\}$ is, for example, 15 or less, preferably 10 or less, and more preferably 5 or less. For example, the lower the value of $\{(TSmax-TSmin)/TSmax\times100\}$, the more preferable.

The dynamic viscoelasticity measurement of the base material layer is performed as follows.

A base material layer, which is a material for manufacturing the endless belt, is prepared, or a base material layer is prepared by peeling off a layer other than a base material layer from the endless belt. The base material layer is cut into a rectangle having a size of 20 mm×4 mm, and this rectangle is used as a test piece. The long side of the test piece is aligned with the direction of rotation of the endless belt. Locations where the test pieces are prepared are a total of 20 locations of 5 locations at equal intervals in the width direction of the endless belt (that is, evenly from the vicinity of one end to the vicinity of the other end) and 4 locations at equal intervals in the circumferential direction.

The measurement is performed using a dynamic viscoelasticity measurement device and with a temperature inside a measuring portion of a measurement device maintained at 35° C. under the measurement environment temperature of 24° C.±3° C. and a relative humidity of 55±5%. The dynamic viscoelasticity measurement is performed in a tensile mode, and a storage elastic modulus E' and a loss elastic modulus E" are measured at the measurement frequency in a range from 0.1 Hz to 100 Hz, and the loss tangent (tan $\delta$=E"/E') is obtained. A graph showing the relationship between the measurement frequency (Hz) and the loss tangent (tan $\delta$) is drawn, and in a case where in 18 or more test pieces among 20 test pieces, the value of the loss tangent at the measurement frequency in a range from 0.1 Hz to 10 Hz is smaller than the value of the loss tangent at the measurement frequency in a range from 10 Hz to 100 Hz, this requirement shall be satisfied.

The value of the loss tangent at a specific measurement frequency is the arithmetic mean of the values of 20 test pieces.

Regarding the dynamic viscoelasticity at a temperature of 35° C. of the base material layer, making the value of the loss tangent at the measurement frequency in a range from 0.1 Hz to 10 Hz smaller than the value of the loss tangent at the measurement frequency in a range from 10 Hz to 100 Hz can be realized by increasing an elastic region of a substrate portion of the base material layer and increasing the uniformity. Increasing the elastic region of the substrate portion of the base material layer and increasing the uniformity can be realized, for example, by reducing the amount of granular reinforcing material such as carbon black or inorganic particles that are added to an elastic material such as rubber when manufacturing the base material layer.

The tensile stress of the base material layer is measured as follows.

A base material layer, which is a material for manufacturing the endless belt, is prepared, or a base material layer is prepared by peeling off a layer other than a base material layer from the endless belt. The base material layer is cut into a rectangle having a size of 20 mm×4 mm, and this rectangle is used as a test piece. The long side of the test piece is aligned with the direction of rotation of the endless belt. Locations where the test pieces are prepared are a total of 20 locations of 5 locations at equal intervals in the width direction of the endless belt (that is, evenly from the vicinity of one end to the vicinity of the other end) and 4 locations at equal intervals in the circumferential direction.

The test piece is stretched by 5% by using a tensile tester at a tensile speed of 1 mm/min under a measurement environment temperature of 24° C.±3° C. and a relative humidity of 55±5%. The tensile stress at the point in time when the test piece is stretched by 5% is "tensile stress at the time of 5% stretch". The test piece is stretched by 5%, the 5% stretch is held for a period of 10 minutes, the maximum value of the tensile stress for a period of 10 minutes is "TSmax", and the minimum value is "TSmin". The tensile tests are performed on 20 test pieces, and the measured values of the tensile stress of 20 test pieces are arithmetically averaged.

The tensile stress when the base material layer is stretched by 5% at a temperature of 24° C. being 7 MPa or more and $\{(TSmax-TSmin)/TSmax\times100\}\leq15$ can be realized by increasing the elasticity of the substrate portion of the base material layer and increasing the vulcanization density of the substrate portion. Increasing the elasticity of the substrate portion of the base material layer can be realized, for example, by mixing a polymer with an elastic material such as rubber when manufacturing the base material layer. Increasing the vulcanization density of the substrate portion can be realized, for example, by adding a large amount of vulcanizing agent, vulcanization assistant, and/or vulcanization accelerator when manufacturing the base material layer.

Hereinafter, the layer configuration and material of the endless belt according to the present exemplary embodiment will be described in detail.

Base Material Layer

The base material layer is preferably, for example, a film or a sheet obtained by causing conductive particles to be contained in a polymer material.

As the polymer material, rubber or resin can be given as an example. As the polymer material, one kind may be used alone, or two or more kinds may be used in combination.

As rubber, chloroprene rubber, epichlorohydrin rubber, isoprene rubber, butyl rubber, polyurethane, silicone rubber, fluororubber, styrene-butadiene rubber, butadiene rubber, nitrile rubber (NBR), ethylene propylene rubber, ethylene-propylene-diene ternary copolymer rubber (EPDM), natural rubber, or mixed rubber thereof can be given as an example.

As resin, polyamide, polyimide, polyamide imide, polyether imide, polyether ether ketone, polyphenylene sulfide, polyether sulfone, polyphenyl sulfone, polysulfone, polyethylene terephthalate, polybutylene terephthalate, polyacetal, polycarbonate, polyester, or mixed resin thereof can be given as an example.

As the conductive particles, carbon black such as Ketjen black, oil furnace black, channel black, or acetylene black; metal particles such as aluminum or nickel; metal oxide particles such as indium tin oxide, tin oxide, zinc oxide, titanium oxide, or yttrium oxide; or the like can be given as an example. As the conductive particles, for example, carbon black is preferable. As the conductive particles, one kind may be used alone, or two or more kinds may be used in combination.

The average primary particle size of the conductive particles is preferably 1 nm or more and 500 nm or less, more preferably 5 nm or more and 200 nm or less, and further preferably 9 nm or more and 25 nm or less, for example.

The base material layer may contain a conductive agent other than the conductive particles. As the conductive agent, an ion conductive substance such as potassium titanate, potassium chloride, sodium perchlorate, or lithium perchlorate; an ion conductive polymer such as polyaniline, polyether, polypyrrole, polysulfone, or polyacetylene; or the like can be given as an example. As the conductive agent, one kind may be used alone, or two or more kinds may be used in combination.

The base material layer is preferably, for example, a conductive elastic layer that contains rubber and conductive particles, and more preferably, for example, a conductive elastic layer that contains at least one of chloroprene rubber or epichlorohydrin rubber, and carbon black.

The total content of the conductive particles and the conductive agent that are contained in the base material layer is preferably set, for example, with the volume resistivity of the endless belt as a guide. The volume resistivity of the endless belt is preferably $1.0\times10^{4}$ Ω·cm or more and $1.0\times10^{12}$ Ω·cm or less, for example.

In the present exemplary embodiment, the measurement of the volume resistivity (Ω·cm) is performed as follows.

A measurement environment is a temperature of 22° C. and a relative humidity of 55%. A sample is placed in the measurement environment for 24 hours or more and controlling temperature-humidity is performed. A resistance measuring machine is a microammeter (R8430A manufactured by Advantest Corp.), and a probe is a UR probe (manufactured by Mitsubishi Chemical Co., Ltd.). An applied voltage is 1 kV, an applied time is 5 seconds, and a load is 1 kgf. Measurement points are a total of 18 points of 6 points at equal intervals in the circumferential direction of the endless belt and 3 points of the central portion and both end portions in the width direction of the endless belt. The measured values of the 18 measurement points are arithmetically averaged.

In a case where the base material layer contains carbon black, the content of carbon black is preferably, for example, 5 parts by mass or more and 40 parts by mass or less with respect to 100 parts by mass of the polymer material.

The base material layer may contain an additive such as a vulcanization agent, a vulcanization assistant, a vulcanization accelerator, a cross-linking agent, an antioxidant, a flame retardant, a colorant, a surfactant, a dispersant, or a filler.

From the viewpoint of durability of the endless belt, the average thickness of the base material layer is preferably 50 μm or more, more preferably 75 μm or more, and further preferably 100 μm or more, for example, and from the viewpoint of flexibility and bending resistance of the endless belt, the average thickness of the base material layer is preferably 1000 μm or less, more preferably 700 μm or less, and further preferably 500 μm or less, for example.

Protective Layer

The endless belt according to the present exemplary embodiment may be provided with a protective layer on at least one of the outer peripheral surface or the inner peripheral surface of the base material layer, and the protective layers are preferably provided, for example, on the outer peripheral surface and the inner peripheral surface of the base material layer. The protective layer provided on the outer peripheral surface of the base material layer configures the outer peripheral surface of the endless belt. The protective layer provided on the inner peripheral surface of the base material layer configures the inner peripheral surface of the endless belt.

The protective layer is, for example, a film or a sheet containing a polymer material.

As the polymer material, the rubber or the resin described above regarding the base material layer can be given as an example.

The protective layer contains, for example, urethane resin and fluorine-containing resin particles.

The urethane resin (also called polyurethane or urethane rubber) is generally synthesized by polymerizing polyisocyanate and a polyol. The urethane resin preferably has, for example, a hard segment and a soft segment.

As the fluorine-containing resin particles, for example, one kind or two or more kinds of particles composed of any of ethylene tetrafluoride resin, ethylene trifluoride chloride resin, propylene hexafluoride resin, vinyl fluoride resin, vinylidene fluoride resin, ethylene difluoride dichloride resin, and copolymer thereof are preferable. Among the resins, as the fluorine-containing resin particles, for example, ethylene tetrafluoride resin particles are preferable.

The average primary particle size of the fluorine-containing resin particles is preferably 10 nm or more and 500 nm or less, more preferably 50 nm or more and 300 nm or less, and further preferably 80 nm or more and 200 nm or less, for example.

The protective layer may contain an additive such as an antioxidant, a cross-linking agent, a flame retardant, a colorant, or a filler.

From the viewpoint of durability of the endless belt, on one side of the base material layer, the average thickness of the protective layer is preferably 0.1 μm or more, more preferably 0.5 μm or more, and further preferably 1 μm or more, for example, and from the viewpoint of flexibility and bending resistance of the endless belt, the average thickness of the protective layer is preferably 50 μm or less, more preferably 20 μm or less, and further preferably 10 μm or less, for example.

Method for Manufacturing Endless Belt

As a method for manufacturing the endless belt, a manufacturing method in which a tubular member to be a base material layer is prepared and a protective layer is formed on the outer peripheral surface or the inner peripheral surface of the tubular member can be given as an example.

A method for manufacturing the tubular member is, for example, extrusion molding in which a composition containing a polymer material and conductive particles is melted and extruded from a die into a belt shape and then solidified; injection molding in which a composition containing a polymer material and conductive particles is melted and put in a belt-shaped mold and then solidified; coating molding in which a composition containing a precursor or monomer of a polymer material and conductive particles is applied to a core body and solidified; or the like. Heating for the purpose of vulcanization of rubber may be performed at an appropriate time in the molding process.

A method for forming the protective layer is, for example, applying a liquid composition containing a polymer material and fluorine-containing resin particles to the outer peripheral surface or the inner peripheral surface of the tubular member and solidifying the liquid composition; applying a liquid composition containing a precursor or a monomer of a polymer material and fluorine-containing resin particles to the outer peripheral surface or the inner peripheral surface of the tubular member and solidifying the liquid composition; or the like. In order to solidify the liquid composition, drying, heating, electron beam irradiation, or ultraviolet irradiation may be performed according to the type of the component.

Belt Unit

Figure 3:
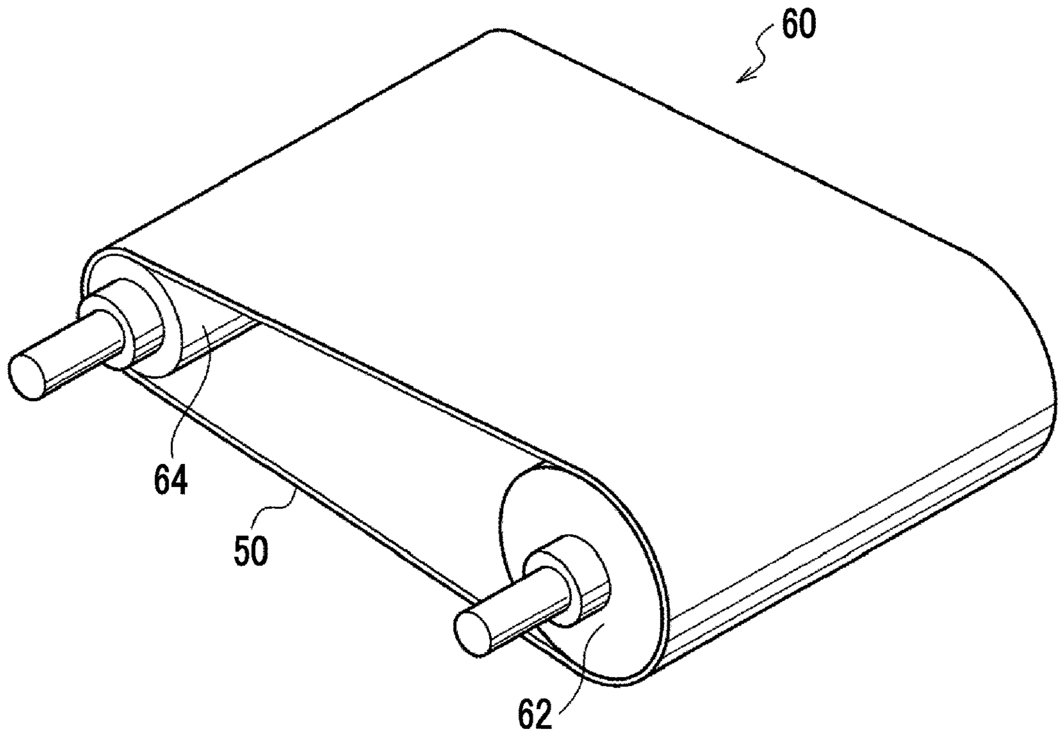
FIG. 3 is a schematic perspective view showing an example of a belt unit according to the present exemplary embodiment.

FIG. 3 is a schematic perspective view showing an example of a belt unit according to the present exemplary embodiment.

A belt unit 60 is shown in a schematic perspective view showing a state where an endless belt is wound around a plurality of roll members. The belt unit 60 includes the endless belt 50, a drive roll 62, and a support roll 64, and has a form in which the endless belt 50 is wound around the drive roll 62 and the support roll 64 in a tensioned state (also called a "stretched form" in the present disclosure). The drive roll 62 is rotated by the power of a driving unit (not shown) connected to the drive roll 62. The endless belt 50 and the support roll 64 rotate in accordance with the rotation of the drive roll 62.

The belt unit 60 is used by being incorporated into an electrophotographic image forming apparatus as a part of transfer unit. The belt unit 60 is suitable for a secondary transfer belt unit, for example. In the belt unit 60, the number of roll members on which the endless belt 50 is stretched is not limited to two, and may be three or more.

Image Forming Apparatus

An image forming apparatus according to the present exemplary embodiment includes a photoconductor, a charging unit that charges the surface of the photoconductor, an electrostatic charge image forming unit that forms an electrostatic charge image on the surface of the charged photoconductor, a developing unit that accommodates a developer containing toner and develops the electrostatic charge image formed on the surface of the photoconductor by using the developer to form a toner image, and a transfer unit having the belt unit according to the present exemplary embodiment and transferring the toner image to a recording medium. The transfer unit includes, for example, an intermediate transfer body, a primary transfer unit that transfers the toner image to the surface of the intermediate transfer body, and a secondary transfer unit that transfers the toner image transferred to the surface of the intermediate transfer body to the recording medium, and the secondary transfer unit has the belt unit according to the present exemplary embodiment.

The image forming apparatus according to the present exemplary embodiment may further include a fixing unit that fixes the toner image transferred to the surface of the recording medium, a photoconductor cleaner that cleans the surface of the photoconductor before charging after the transfer of the toner image, a static eliminator that irradiates the surface of the photoconductor with static elimination light after transfer of the toner image and before charging to eliminate static electricity, and the like. In the image forming apparatus according to the present exemplary embodiment, the portion including the developing unit may have a cartridge structure (process cartridge) which is mounted to and demounted from the image forming apparatus.

Hereinafter, an example of the image forming apparatus according to the present exemplary embodiment will be described. However, there is no limitation to this example. In the following description, main parts shown in the drawing will be described, and the description of other parts will be omitted.

Figure 4:
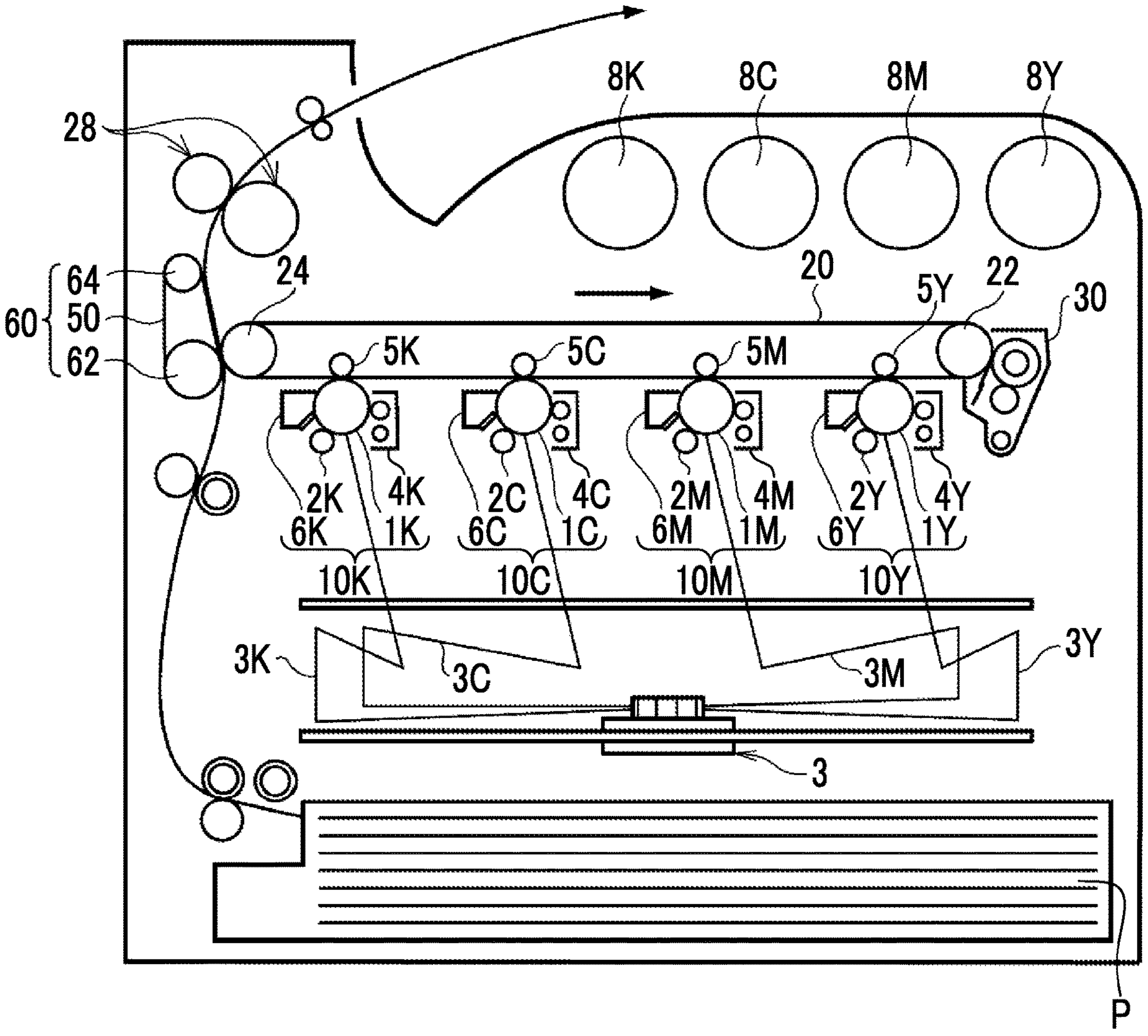
FIG. 4 is a schematic configuration diagram showing an example of an image forming apparatus according to the present exemplary embodiment.

FIG. 4 is a schematic configuration diagram showing an example of the image forming apparatus according to the present exemplary embodiment.

The image forming apparatus shown in FIG. 4 includes first to fourth electrophotographic image forming units 10Y, 10M, 10C, and 10K (image forming units). that output images of colors of yellow (Y), magenta (M), cyan (C), and black (K), based on color-separated image data. The image forming units (hereinafter, there is a case of being simply referred to as "units") 10Y, 10M, 10C, and 10K are arranged side by side to be separated at a predetermined distance from each other in the horizontal direction. The units 10Y, 10M, 10C, and 10K may be process cartridges that are mounted to and demounted from the image forming apparatus.

An intermediate transfer belt (an example of an intermediate transfer body) 20 is provided above the units 10Y, 10M, 10C, and 10K to extend through each unit. The intermediate transfer belt 20 is provided by being wound around a drive roll 22 and a support roll 24 that are in contact with the inner surface of the intermediate transfer belt 20, and travels in the direction from the first unit 10Y toward the fourth unit 10K. The support roll 24 is applied with a force in the direction away from the drive roll 22 by a spring (not shown) or the like, so that tension is applied to the intermediate transfer belt 20 wound around the drive roll 22 and the support roll 24. An intermediate transfer belt cleaning device 30 is provided on the image holding surface side of the intermediate transfer belt 20 so as to face the drive roll 22.

The toners of yellow, magenta, cyan, and black contained in toner cartridges 8Y, 8M, 8C, and 8K are respectively supplied to developing devices (each is an example of a developing unit) 4Y, 4M, 4C, and 4K. of the units 10Y, 10M, 10C, and 10K.

Since the first to fourth units 10Y, 10M, 10C, and 10K have the same configuration and operation, here, the first unit 10Y forming a yellow image and disposed on the upstream side in a traveling direction of the intermediate transfer belt will be described as a representative.

The first unit 10Y has a photoconductor 1Y. A charging roll (an example of a charging unit) 2Y that charges the surface of the photoconductor 1Y to a potential determined in advance, an exposure device (an example of an electrostatic charge image forming unit) 3 that exposes the charged surface with a laser beam 3Y based on a color-separated image signal to form an electrostatic charge image, a developing device (an example of a developing unit) 4Y that develops the electrostatic charge image by supplying charged toner to the electrostatic charge image, a primary transfer roll (an example of a primary transfer unit) 5Y that transfers the developed toner image onto the intermediate transfer belt 20, and a photoconductor cleaning device 6Y that removes the toner remaining on the surface of the photoconductor 1Y after the primary transfer are disposed in order around the photoconductor 1Y.

The primary transfer roll 5Y is disposed inside the intermediate transfer belt 20 and is provided at a position facing the photoconductor 1Y. A bias power source (not shown) for applying a primary transfer bias is connected to each of the primary transfer rolls 5Y, 5M, 5C, and 5K of the units.

The belt unit 60 is a belt unit provided with the endless belt 50 (an example of the endless belt according to the present exemplary embodiment). The belt unit 60 includes the endless belt 50, the drive roll 62, and the support roll 64. The belt unit 60 is disposed outside the intermediate transfer belt 20 and is provided at a position facing the support roll 24. A bias power source (not shown) for applying a secondary transfer bias is connected to the belt unit 60.

Hereinafter, the operation of forming a yellow image in the first unit 10Y will be described.

First, prior to the operation, the surface of the photoconductor 1Y is charged to a potential in the range of −600 V to −800 V by the charging roll 2Y.

The photoconductor 1Y is formed by laminating a photosensitive layer on a conductive substrate (having, for example, a volume resistivity at 20° C. of $1\times10^{-6}$ Ωcm or less). The photosensitive layer usually has high resistance (resistance of a general resin). However, the photosensitive layer has a property that in a case where the photosensitive layer is irradiated with a laser beam, the specific resistance of the portion irradiated with the laser beam changes. Therefore, the surface of the charged photoconductor 1Y is irradiated with the laser beam 3Y from the exposure device 3 according to the image data for yellow, which is sent from a control unit (not shown). In this way, an electrostatic charge image having a yellow image pattern is formed on the surface of the photoconductor 1Y.

The electrostatic charge image is an image that is formed on the surface of the photoconductor 1Y by charging, and is a so-called negative latent image that is formed due to the specific resistance of the irradiated portion of the photosensitive layer being lowered by the laser beam 3Y and the charged electric charges on the surface of the photoconductor 1Y flowing, and on the other hand, the electric charges of the portion not irradiated with the laser beam 3Y remaining.

The electrostatic charge image formed on the photoconductor 1Y rotates to a developing position determined in advance, according to the traveling of the photoconductor 1Y. Then, at the developing position, the electrostatic charge image on the photoconductor 1Y is developed and visualized as a toner image by the developing device 4Y.

For example, an electrostatic charge image developing agent containing at least a yellow toner and a carrier is accommodated in the developing device 4Y. The yellow toner is triboelectrically charged by being agitated inside the developing device 4Y, has an electric charge having the same polarity (negative polarity) as the charged electric charge on the photoconductor 1Y, and is held on a developer roll (an example of a developer holder). Then, the surface of the photoconductor 1Y passes through the developing device 4Y, so that the yellow toner is electrostatically stuck to the statically eliminated latent image portion on the surface of the photoconductor 1Y, and the latent image is developed by the yellow toner. The photoconductor 1Y on which the yellow toner image is formed is continuously traveled at a speed determined in advance, and the developed toner image on the photoconductor 1Y is transported to a primary transfer position determined in advance.

In a case where the yellow toner image on the photoconductor 1Y is transferred to the primary transfer position, a primary transfer bias is applied to the primary transfer roll 5Y, and an electrostatic force from the photoconductor 1Y toward the primary transfer roll 5Y acts on the toner image, and the toner image on the photoconductor 1Y is transferred onto the intermediate transfer belt 20. The transfer bias that is applied at this time has a (+) polarity opposite to the polarity (−) of the toner, and is controlled to, for example, +10 μA by a control unit (not shown) in the first unit 10Y.

The primary transfer bias that is applied to the primary transfer rolls 5M, 5C, and 5K of the second unit 10M and the subsequent units is also controlled in accordance with to the first unit.

In this way, the intermediate transfer belt 20 to which the yellow toner image is transferred in the first unit 10Y is sequentially transported through the second to fourth units 10M, 10C, and 10K, and the toner images of the respective colors are superimposed, and thus multiple transfer is performed.

The intermediate transfer belt 20 to which the toner images of four colors are multiple-transferred through the first to fourth units reaches a secondary transfer unit composed of the intermediate transfer belt 20, the support roll 24, and the belt unit 60. On the other hand, recording paper (an example of the recording medium) P is fed to the gap where the belt unit 60 and the intermediate transfer belt 20 are in contact with each other via a supply mechanism at a timing determined in advance, and the secondary transfer bias is applied to the support roll 24. The transfer bias that is applied at this time has a (−) polarity that is the identical polarity to the toner polarity (−), and the electrostatic force from the intermediate transfer belt 20 toward the recording paper P acts on the toner image, and the toner image on the intermediate transfer belt 20 is transferred onto the recording paper P. The secondary transfer bias at this time is determined according to the resistance detected by a resistance detection unit (not shown) that detects the resistance of the secondary transfer unit, and is controlled in voltage.

The recording paper P with the toner image transferred thereto is sent to a pressure contact portion (nip portion) of a pair of fixing rolls of a fixing device (an example of a fixing unit) 28, the toner image is fixed to the recording paper P, and a fixed image is formed. The recording paper P on which the fixing of the color image has been completed is carried out toward a discharge unit, and a series of color image forming operations is ended.

As the recording paper P to which the toner image is transferred, plain paper that is used in electrophotographic copying machines, printers, or the like can be given as an example. As the recording medium, in addition to the recording paper P, an OHP sheet or the like can be given as an example.

EXAMPLES

Hereinafter, the present exemplary embodiment will be more specifically described by illustrating examples. However, the present exemplary embodiment is not limited to the following examples. Unless otherwise specified, synthesis, treatment, production, and the like were performed at room temperature (24° C.±3° C.). In the following description, unless otherwise specified, "parts" and "%" are all based on mass.

Example 1

Fabrication of Base Material Layer

An annular belt is fabricated by mixing a filler, a plasticizer, a softener, and the like with a rubber material and kneading the mixture, then further adding sulfur, a vulcanization accelerator, and the like to the mixture and kneading the mixture, and extruding the mixture into a tube shape having a predetermined inner periphery and thickness by using an extruder. Specifically, a rubber composition having the following rubber formulation 1 is prepared.

Rubber Formulation 1

Chloroprene rubber (CR) (Tosoh, TSR-61) 80 parts
Ethylene-propylene-diene rubber (EPDM) (Sumitomo Chemical, ESPLEN® 505) 20 parts
Carbon black (Mitsubishi Chemical, #3030B) 25 parts
Sulfur (Bayer, RENOGRAN® S-80) 1 part
Zinc oxide (Bayer, RENOGRAN® ZnO-80) 6 parts Magnesium oxide (Kyowa Chemical Industry, KYOWA MAG® 150) 4 parts Vulcanization accelerator (Ouchi Shinko Kagaku Kogyo, NOXELLER® M) 1 part Stearic acid 0.5 parts The composition is as described above. More specifically, a conductive rubber material containing carbon black and ethylene-propylene-diene rubber are mixed with chloroprene rubber, and another material is further added to the mixture and kneaded. The mixture is extruded by a kneading extruder, dried with hot air, and further heated for vulcanization to obtain a tubular body having a diameter (outer diameter) of 40 mm and an average thickness of 450 μm. The tubular body is cut to a length of 355 mm to obtain a base material A.

Fabrication of Protective Layer

1% by mass of a curing agent (LOCTITE® WH-1, Henkel Japan Ltd.) is added to a PTFE (polytetrafluoroethylene)-containing urethane resin BONDERITE® T862A, Henkel Japan Ltd.) and diluted with water to adjust the amount of PTFE to 10% by mass, and the obtained mixture is used as a coating liquid.

The coating liquid is sprayed on the outer peripheral surface of the base material A while rotating the base material A with the central axis of the base material A being in the horizontal direction. Next, hot air drying is performed at a temperature of 150° C. for 35 minutes to form a protective layer. The average thickness of the protective layer on the outer peripheral surface is set to 6 μm. Next, the same coating liquid is also sprayed on the inner peripheral surface of the base material A, and hot air drying is performed in the same manner to form a protective layer. The average thickness of the protective layer on the inner peripheral surface is set to 6 μm.

In this way, an endless belt is obtained.

EXAMPLE 2

An endless belt is obtained in the same manner as in Example 1 except that the amount of the vulcanization accelerator is increased to 5 parts in the preparation of the base material.

Example 3

An endless belt is obtained in the same manner as in Example 1 except that the amount of carbon black is reduced to 15 parts in the preparation of the base material.

Comparative Example 1

An endless belt is obtained in the same manner as in Example 1 except that in the preparation of the base material, the amount of chloroprene rubber is increased to 85 parts and the amount of ethylene-propylene-diene rubber is reduced to 15 parts.

Comparative Example 2

An endless belt is obtained in the same manner as in Example 1 except that in the preparation of the base material, the amount of chloroprene rubber is reduced to 70 parts and the amount of ethylene-propylene-diene rubber is reduced to 30 parts.

Comparative Example 3

An endless belt is obtained in the same manner as in Example 1 except that the amount of carbon black is reduced to 50 parts in the preparation of the base material.

Evaluation of Mechanical Characteristic of Base Material Layer

The dynamic viscoelasticity measurement and the tensile test of the base material layer are performed according to the method described above. The results are shown in Table 1.

Performance Evaluation of Endless Belt

The endless belt obtained in each example is used as a secondary transfer belt to fabricate a secondary transfer unit. The secondary transfer unit is mounted on a modified machine of an image forming apparatus DocuColor-7171P (FUJIFILM Business Innovation Corp.). A guide for recording medium transport is mounted to an end portion of the secondary transfer belt, and the transport speed of the recording medium is adjusted to be constant.

Transport Performance of Endless Belt

In order to secure stable image quality, the endless belt (the secondary transfer belt) is required to have excellent transport performance. The transport performance of the endless belt is affected by a local tension difference of the endless belt and a speed fluctuation with rotation. The transport performance of the endless belt is evaluated by the following method.

The endless belt is continuously rotationally driven in a state where the endless belt is stretched with a stretch ratio of 4% by a stretching roll. The rotation speed of the rotational driving is set to 540 mm/s, and the driving time is set to 120 hours. The rotation is stopped after the rotational driving, and a damaged state, such as scratches on the end portion of the endless belt and scratches on the outer peripheral surface of the endless belt, and the position of the end portion of the endless belt are confirmed, and belt walk is evaluated based on the confirmed results.

The transport performance of the endless belt is classified as follows. The results are shown in Table 1.

A: The belt walk is within a control aim range.

B: The belt walk is below an operating limit range.

C: The belt walk is above the operating limit range.

Cleanness and Surface Nature of Endless Belt

In order to secure stable image quality, the endless belt (the secondary transfer belt) is required to maintain the cleanness and surface nature of the outer peripheral surface even though the endless belt (the secondary transfer belt) is affected by a change in stretch with rotational movement or a fluctuation in external load, and environment. The cleanness of the outer peripheral surface of the endless belt and a change in the state of the surface are evaluated by the following method.

After the image formation on the recording medium and the transport operation of the recording medium are performed 10,000 times in succession, the outer peripheral surface of the endless belt is observed at a magnification of 100 times by using a CCD camera, and the presence or absence of foreign matter adhesion and a surface state change is qualitatively evaluated. Further, ten-point average surface roughness Rz of the outer peripheral surface of the endless belt is measured using a contact type surface roughness measurement device (Surfcom 570A, manufactured by Tokyo Seimitsu Co., Ltd.). The surface roughness is measured using a contact needle with a diamond tip (5 μmR, 90° cone), and the measurement distance is set to 2.5 mm. The measurement is performed three times while changing the location of the outer peripheral surface of the endless belt, and the average value is taken as the ten-point average surface roughness Rz.

The cleanness of the endless belt is classified as follows. The results are shown in Table 1.

A: No foreign matter adhesion is recognized by visual observation and magnified observation.

B: There is foreign matter that is not recognized by visual observation but is recognized by magnified observation.

C: There is foreign matter that is recognized by visual observation.

The surface nature of the endless belt is classified as follows. The results are shown in Table 1.

A: A fluctuation in the value of surface roughness is small, and no abnormality is recognized on the surface by magnified observation.

B: There is a fluctuation in the value of surface roughness, and minute cracks are recognized by magnified observation.

C: The value of surface roughness decreases and a large number of cracks are recognized on the surface by magnified observation.

Image Quality Uniformity 100 pieces of halftone images each having an image density of 20% are continuously formed on a recording medium (paper, A3 size, basis weight: 82 g/m2, thickness: 97 μm). The last 10 images are visually observed. The above image quality evaluation is performed after the evaluation of the initial state, the transport performance of the endless belt, and the cleanness of the endless belt.

The image quality uniformity is classified as follows. The results are shown in Table 1.

A: No color unevenness and color loss are recognized.

B: Minor color unevenness is recognized.

C: Color unevenness and color loss are partially recognized.

The "requirement for tan δ" described in Table 1 means that "in the dynamic viscoelasticity measurement at a temperature of 35° C. of the base material layer, the value of the loss tangent at the measurement frequency in a range from 0.1 Hz to 10 Hz is smaller than the value of the loss tangent at the measurement frequency in a range from 10 Hz to 100 Hz.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An endless belt comprising:

a base material layer containing a polymer material and conductive particles, the polymer material contains at least one of chloroprene rubber or epichlorohydrin rubber, and the conductive particles contain carbon black, a content of carbon black is 5 parts by mass or more and 40 parts by mass or less with respect to 100 parts by mass of the polymer material, wherein in dynamic viscoelasticity measurement at a temperature of 35° C., a value of loss tangent of the base material layer at a measurement frequency in a range from 0.1 Hz to 10 Hz is smaller than a value of loss tangent of the base material layer at a measurement frequency in a range from 10 Hz to 100 Hz, and tensile stress when the base material layer is stretched by 5% at a temperature of 24° C. is 7 MPa or more, and when the base material layer is stretched by 5% at a temperature of 24° C. and held for a period of 10 minutes, a maximum value TSmax and a minimum value TSmin of the tensile stress of the base material layer during the period satisfy a relationship of $\{(TSmax-TSmin)/TSmax\times 100\}\leq 15$.

TABLE 1

| | Base material layer | | | | | | | Performance evaluation | | | |
|---|---|---|---|---|---|---|---|---|---|---|---|
| | Requirement for tanδ | tanδ 0.1 Hz | tanδ 1 Hz | tanδ 10 Hz | tanδ 100 Hz | Tensile stress: At time of 5% stretch [MPa] | Tensile stress: (TSmax − TSmin)/TSmax × 100 | Transport performance | Cleanness | Surface nature | Image quality uniformity |
| Comparative Example 1 | Not satisfied | 0.158 | 0.149 | 0.143 | 0.136 | 8.43 | 16.50 | C | B | C | C |
| Comparative Example 2 | Satisfied | 0.110 | 0.118 | 0.134 | 0.167 | 5.77 | 9.80 | C | A | A | B |
| Comparative Example 3 | Satisfied | 0.134 | 0.142 | 0.164 | 0.184 | 11.62 | 22.80 | C | A | B | B |
| Example 1 | Satisfied | 0.097 | 0.105 | 0.134 | 0.154 | 8.41 | 6.21 | A | A | A | A |
| Example 2 | Satisfied | 0.137 | 0.149 | 0.154 | 0.168 | 10.15 | 12.84 | B | A | A | A |
| Example 3 | Satisfied | 0.099 | 0.100 | 0.118 | 0.122 | 7.21 | 5.25 | A | B | B | B |

From the results shown in Table 1, it can be seen that in the examples, as compared with the comparative examples, the state of the belt walk, the cleanness, and the surface cracking are improved as a result of suppressing variation in the contact pressure in the axial direction of the endless belt when a rotating body is brought into contact with the outer peripheral surface of the endless belt.

2. The endless belt according to claim 1, wherein the tensile stress when the base material layer is stretched by 5% at a temperature of 24° C. is 7 MPa or more and 10 MPa or less.

3. The endless belt according to claim 1, wherein when the base material layer is stretched by 5% at a temperature of 24° C. and held for a period of 10 minutes, the maximum value TSmax and the minimum value TSmin of the tensile stress of the base material layer during the period satisfy a relationship of {(TSmax-TSmin)/TSmax×100}≤10.

4. The endless belt according to claim 2,
wherein when the base material layer is stretched by 5% at a temperature of 24° C. and held for a period of 10 minutes, the maximum value TSmax and the minimum value TSmin of the tensile stress of the base material layer during the period satisfy a relationship of {(TSmax-TSmin)/TSmax×100}≤10.

5. The endless belt according to claim 1, further comprising:
a protective layer provided on at least one of an outer peripheral surface or an inner peripheral surface of the base material layer.

6. The endless belt according to claim 2, further comprising:
a protective layer provided on at least one of an outer peripheral surface or an inner peripheral surface of the base material layer.

7. The endless belt according to claim 3, further comprising:
a protective layer provided on at least one of an outer peripheral surface or an inner peripheral surface of the base material layer.

8. The endless belt according to claim 4, further comprising:
a protective layer provided on at least one of an outer peripheral surface or an inner peripheral surface of the base material layer.

9. A belt unit comprising:
the endless belt according to claim 1; and
a plurality of roll members around which the endless belt is wound in a tensioned state,
wherein at least one of the plurality of roll members is a drive roll for rotating the endless belt, and
the belt unit is mounted to and demounted from an image forming apparatus.

10. A belt unit comprising:
the endless belt according to claim 2; and
a plurality of roll members around which the endless belt is wound in a tensioned state,
wherein at least one of the plurality of roll members is a drive roll for rotating the endless belt, and
the belt unit is mounted to and demounted from an image forming apparatus.

11. A belt unit comprising:
the endless belt according to claim 3; and
a plurality of roll members around which the endless belt is wound in a tensioned state,
wherein at least one of the plurality of roll members is a drive roll for rotating the endless belt, and
the belt unit is mounted to and demounted from an image forming apparatus.

12. A belt unit comprising:
the endless belt according to claim 4; and
a plurality of roll members around which the endless belt is wound in a tensioned state,
wherein at least one of the plurality of roll members is a drive roll for rotating the endless belt, and
the belt unit is mounted to and demounted from an image forming apparatus.

13. A belt unit comprising:
the endless belt according to claim 5; and
a plurality of roll members around which the endless belt is wound in a tensioned state,
wherein at least one of the plurality of roll members is a drive roll for rotating the endless belt, and
the belt unit is mounted to and demounted from an image forming apparatus.

14. A belt unit comprising:
the endless belt according to claim 6; and
a plurality of roll members around which the endless belt is wound in a tensioned state,
wherein at least one of the plurality of roll members is a drive roll for rotating the endless belt, and
the belt unit is mounted to and demounted from an image forming apparatus.

15. A belt unit comprising:
the endless belt according to claim 7; and
a plurality of roll members around which the endless belt is wound in a tensioned state,
wherein at least one of the plurality of roll members is a drive roll for rotating the endless belt, and
the belt unit is mounted to and demounted from an image forming apparatus.

16. A belt unit comprising:
the endless belt according to claim 8; and
a plurality of roll members around which the endless belt is wound in a tensioned state,
wherein at least one of the plurality of roll members is a drive roll for rotating the endless belt, and
the belt unit is mounted to and demounted from an image forming apparatus.

17. An image forming apparatus comprising:
a photoconductor;
a charging unit that charges a surface of the photoconductor;
an electrostatic charge image forming unit that forms an electrostatic charge image on the surface of the charged photoconductor;
a developing unit that accommodates a developer containing toner and develops the electrostatic charge image formed on the surface of the photoconductor by using the developer to form a toner image; and
a transfer unit that includes the belt unit according to claim 9 and transfers the toner image to a recording medium.

18. An image forming apparatus comprising:
a photoconductor;
a charging unit that charges a surface of the photoconductor;
an electrostatic charge image forming unit that forms an electrostatic charge image on the surface of the charged photoconductor;
a developing unit that accommodates a developer containing toner and develops the electrostatic charge image formed on the surface of the photoconductor by using the developer to form a toner image; and
a transfer unit that includes the belt unit according to claim 10 and transfers the toner image to a recording medium.

19. An image forming apparatus comprising:
a photoconductor;
a charging unit that charges a surface of the photoconductor;
an electrostatic charge image forming unit that forms an electrostatic charge image on the surface of the charged photoconductor;
a developing unit that accommodates a developer containing toner and develops the electrostatic charge image formed on the surface of the photoconductor by using the developer to form a toner image; and a transfer unit that includes the belt unit according to claim 11 and transfers the toner image to a recording medium.

20. The image forming apparatus according to claim 17, wherein the transfer unit includes an intermediate transfer body, a primary transfer unit that transfers the toner image to a surface of the intermediate transfer body, and a secondary transfer unit that transfers the toner image transferred to the surface of the intermediate transfer body to the recording medium, and the secondary transfer unit includes the belt unit according to claim 9.

* * * * *